US012729573B2

(12) United States Patent
Geller

(10) Patent No.: US 12,729,573 B2
(45) Date of Patent: Sep. 8, 2026

(54) FITTING, IN PARTICULAR FURNITURE FITTING, FOR MOVABLY MOUNTING A PIVOTING ELEMENT

(71) Applicant: Julius Blum GmbH, Hoechst (AT)

(72) Inventor: Irmela Mara Geller, Dornbirn (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/659,395

(22) Filed: May 9, 2024

(65) Prior Publication Data

US 2024/0287839 A1 Aug. 29, 2024

Related U.S. Application Data

(63) Continuation of application No. PCT/AT2022/060382, filed on Nov. 7, 2022.

(30) Foreign Application Priority Data

Nov. 26, 2021 (AT) .............................. A 50948/2021

(51) Int. Cl.
*E05D 3/06* (2006.01)
*E05D 3/14* (2006.01)
*E05D 7/04* (2006.01)

(52) U.S. Cl.
CPC ............... *E05D 3/142* (2013.01); *E05D 7/04* (2013.01); *E05Y 2800/268* (2013.01); *E05Y 2900/20* (2013.01)

(58) Field of Classification Search
CPC ........... A47B 95/00; E05D 3/142; E05D 7/04; E05D 7/0407; E05D 7/0415;
(Continued)

(56) References Cited

U.S. PATENT DOCUMENTS 3,143,760 A * 8/1964 Ferguson ................ E05D 7/081 16/229
3,786,534 A * 1/1974 Ferguson ................ E05D 7/081 16/229
(Continued)

FOREIGN PATENT DOCUMENTS

CH 331159 8/1958
CN 214740665 11/2021
(Continued)

OTHER PUBLICATIONS

International Search Report issued Mar. 31, 2023 in International (PCT) Application No. PCT/AT2022/060382.

*Primary Examiner* — Chuck Y Mah
(74) *Attorney, Agent, or Firm* — Wenderoth, Lind & Ponack, L.L.P.

(57) ABSTRACT

A fitting for movably mounting a pivoting element relative to a stationary support includes a first fitting part to be fastened to a panel of the support; a second fitting part for fastening to the pivoting element, the second fitting part being pivotably connected to the first fitting part; a hinge pin arranged on the second fitting part and oriented substantially orthogonally relative to the longitudinal extent of the first fitting part and/or the second fitting part; and an adjusting device for adjusting the orientation of the second fitting part relative to the first fitting part along the at least one hinge pin. The second fitting part is displaceable relative to the first fitting part parallel to the hinge pin via the adjusting device, and the adjusting device is spaced from the hinge pin in the direction of the longitudinal extent of the second fitting part.

28 Claims, 7 Drawing Sheets

(58) Field of Classification Search
CPC ........... E05D 7/0423; E05D 5/02; E05D 5/08; E05D 5/0215; E05D 5/0223; E05D 5/0238; E05D 5/0276; E05D 5/046; E05D 5/16; E05D 7/0009; E05D 7/10; E05D 7/12; E05D 7/125; E05D 7/123; E05D 7/1061; E05D 2007/128; E05D 2007/1094; E05D 11/1021; E05D 11/1007; E05Y 2800/268; E05Y 2900/20; E05Y 16/254; E05Y 16/258; E05Y 16/257; E05Y 16/238; E05Y 16/24; E05Y 16/245
See application file for complete search history.

(56) References Cited

U.S. PATENT DOCUMENTS

| | | | | |
|---|---|---|---|---|
| 6,539,579 | B2 * | 4/2003 | Minami | E05D 7/1011 292/228 |
| 7,552,511 | B2 * | 6/2009 | Campbell | E05D 7/12 16/236 |
| 9,617,773 | B2 * | 4/2017 | Cooper | E05D 7/125 |
| 10,407,963 | B2 | 9/2019 | Salice | |
| 11,795,745 | B2 | 10/2023 | Geller | |
| 2010/0242227 | A1 * | 9/2010 | Tagtow | E05D 7/0423 16/245 |
| 2018/0252016 | A1 | 9/2018 | Salice | |
| 2019/0071908 | A1 | 3/2019 | Salice | |
| 2021/0115714 | A1 | 4/2021 | Duer | |
| 2021/0355726 | A1 | 11/2021 | Geller | |

FOREIGN PATENT DOCUMENTS

| | | | | |
|---|---|---|---|---|
| EP | 0 919 685 | | | 6/1999 |
| EP | 3 289 157 | | | 10/2020 |
| IT | MI20100555 | | | 10/2011 |
| JP | S5836776 | Y2 | * | 8/1983 |
| JP | 2987122 | B2 | * | 12/1999 |
| JP | 2018-514670 | | | 6/2018 |
| JP | 2019-512627 | | | 5/2019 |
| JP | 2021-529904 | | | 11/2021 |
| WO | 2020/163884 | | | 8/2020 |

* cited by examiner

FITTING, IN PARTICULAR FURNITURE FITTING, FOR MOVABLY MOUNTING A PIVOTING ELEMENT

The present application is a continuation of International Application PCT/AT2022/060382 filed on Nov. 7, 2022. Thus, all of the subject matter of International Application PCT/AT2022/060382 is incorporated herein by reference.

BACKGROUND OF THE INVENTION

The invention relates to a fitting, in particular a furniture fitting, for movably mounting a pivoting element, in particular a furniture part, door or window, relative to a stationary support. The fitting includes:

- a first fitting part which is formed to be fastened to a, preferably substantially horizontally aligned, panel of the support,
- a second fitting part for fastening to the pivoting element, wherein the second fitting part is pivotably connected to the first fitting part,
- at least one hinge pin which is arranged on the second fitting part and oriented substantially orthogonally relative to a longitudinal extent of the first fitting part and/or the second fitting part, and
- at least one adjusting device for adjusting an alignment of the second fitting part relative to the first fitting part along the at least one hinge pin, wherein the second fitting part is displaceable relative to the first fitting part parallel to the at least one hinge pin via the at least one adjusting device.

The invention also relates to an assembly consisting of at least one such fitting and a mounting, to a piece of furniture with a stationary support and at least one such fitting or such an assembly as well as to a method for adjusting the height of such a fitting.

Such a fitting is already known from the document EP 3 289 157 B9, in which a positioning of the fitting relative to the pivoting element can be changed for adjusting the height of the pivoting element with respect to the fitting via an eccentric screw of an adjusting device. The eccentric screw is arranged on a lateral bar which extends parallel to a hinge pin of the fitting and orthogonal to a longitudinal extent of the fitting.

Due to the kinematics of the fittings in the case of such pivoting elements, the positioning possibilities and access possibilities of the adjusting devices are limited. In particular in the installation of heavy pivoting elements on such fittings, it is essential to make a simple fastening and height adjustment of the pivoting elements relative to the fittings possible Moreover, an esthetically appealing appearance and a high degree of stability with a high level of convenience in the adjustment in spite of the compact design of the fittings are of significant importance. A disadvantage of the state of the art is that, due to the orthogonally oriented bar, a groove that is complex to manufacture is necessary in the pivoting element. Furthermore, two orthogonal spatial directions or degrees of freedom are to be taken into consideration in the positioning of the fitting in the pivoting element, and attention must be paid to sufficiently low tolerances. In addition, the visual impression of the fitting is impaired due to the L-shaped fitting. The strength of the pivoting element is also reduced due to the bar and a breaking away of the fitting from the pivoting element is promoted. The fitting must also be spaced further apart from an upper edge of the pivoting element in the vertical direction because of the bar, wherein this must be taken into account in particular also in the case of the corresponding furniture panels. Furthermore, a height adjustment through the eccentric screw is limited, wherein, in particular in the case of tall pivoting elements, an accessibility to the adjusting device is impaired.

SUMMARY OF THE INVENTION

The objective of the present invention is therefore to specify a fitting that is improved compared with the state of the art for movably mounting a pivoting element, in which the disadvantages of the state of the art are at least partially remedied. The fitting is characterized in particular by a compact design, a simplified positioning on the pivoting element and a user-friendly adjustment of a height of the pivoting element relative to the fitting.

Accordingly, the at least one adjusting device is spaced apart from the at least one hinge pin in the direction of the longitudinal extent of the second fitting part.

This makes it possible first of all for no elaborate groove to be necessary for positioning the second fitting part on or in the pivoting element, and for the fitting to be compact and arranged close to an upper edge and/or lower edge in the use position.

A height adjustment of the pivoting element (in the use position) relative to the first fitting part can also be carried out conveniently during installation and/or by a user of the fitting. The pivoting element has a reduced breakaway behavior due to the structural design of the fitting and the panel of the support can be more flexibly adapted to a design of the pivoting element.

Added to this is the positive property that a height adjustment of the pivoting element can be generated by the at least one adjusting device spaced apart from the at least one hinge pin in the longitudinal extent of the second fitting part with reduced exertion of force, wherein a leverage between the at least one adjusting device and the at least one hinge pin can in particular be utilized.

A transmission with respect to an exertion of force and/or a precision of the vertical positioning of the first fitting part relative to the pivoting element can be adjusted via a spacing apart of the at least one adjusting device with respect to the at least one hinge pin and/or a bearing point between the at least one adjusting device and the at least one hinge pin.

In this context, the adjusting device can be considered to be the operating mechanism of the fitting for height adjustment for an installer or user, which operating mechanism optionally interacts with separate transmission components for moving fitting parts after actuation of the adjusting device.

As stated at the beginning, protection is also sought for an assembly consisting of at least one such fitting and a mounting for the arrangement of the second fitting part inside the mounting at least in regions.

As stated at the beginning, protection is also sought for a piece of furniture with a stationary support and at least one such fitting and/or such an assembly for movably mounting a pivoting element, in particular a furniture part, door or window, relative to the stationary support, wherein the first fitting part is inserted in the stationary support at least in regions and the second fitting part is inserted in the pivoting element, preferably a mounting integrated in the pivoting element, at least in regions.

As stated at the beginning, protection is also sought for a method for adjusting the height of such a fitting, in particular of a pivoting element relative to a stationary support of such a piece of furniture through such a fitting. A transmission device is transferred into a rotational movement relative to the second fitting part by the at least one adjusting device and the second fitting part is transferred into a translational movement relative to the first fitting part via the transmission device.

According to an advantageous design of the invention, the second fitting part is formed substantially cuboidal. Preferably, the at least one hinge pin is arranged in the region of a first end of the second fitting part and the at least one adjusting device is arranged in the region of a second end of the second fitting part spaced apart in the longitudinal direction of the second fitting part.

The second fitting part can comprise a damping mechanism which is integrated, for example as an embedded damper, in the second fitting part and/or in the first fitting part.

Advantageously, the first fitting part is arranged on the second fitting part via at least one articulated lever. Preferably, the at least one articulated lever is arranged on at least one of the at least one hinge pin, preferably via at least one coupling mechanism, particularly preferably connecting plate.

The at least one coupling mechanism can involve a dual function in the connection of the at least one articulated lever to the second fitting part and in the guiding or facilitation of a transmission of the height adjustment of the pivoting element with respect to the first fitting part on the at least one adjusting device.

It has proved to be beneficial that the at least one hinge pin is formed as at least one pin, preferably precisely two pins. Preferably, the second fitting part and/or the at least one coupling mechanism can be guided by at least one pin during a movement of the second fitting part relative to the first fitting part and/or the at least one articulated lever is arranged on the second fitting part via at least one pin and/or a further pin (articulated lever pin) is provided for securing the at least one articulated lever.

Through the use of pins, a translational movement for the parallel height adjustment without undesired pivoting movement is particularly promoted.

According to an advantageous embodiment of the invention, a transmission device is arranged between the at least one adjusting device and the at least one hinge pin in the longitudinal direction of the second fitting part.

Through the transmission device, an adjustment on the at least one adjusting device is particularly beneficially transmittable to a coupling mechanism and/or the first fitting part. For example, the by means of the at least one adjusting device the transmission device can be transferred into a rotational movement relative to the second fitting part and/or the second fitting part can be transferred into a translational movement relative to the first fitting part via the transmission device. For example, the transmission device can comprise a receiver for the coupling mechanism, which is arranged on the at least one hinge pin and generates a movement coupling between the transmission device and the coupling mechanism guided on the at least one hinge pin.

It has proved to be advantageous that the transmission device is designed as a, preferably plate-shaped, rocker, and the transmission device is arranged rotatable on the second fitting part via a bearing mechanism, preferably between the at least one hinge pin and the at least one adjusting device and/or spaced apart from the at least one hinge pin and/or the at least one adjusting device. Preferably, a rotational movement of the transmission device around the bearing mechanism facilitated via the bearing mechanism can be translated into a translational movement of the second fitting part relative to the at least one hinge pin, particularly preferably via a coupling of the transmission device to at least one optionally present coupling mechanism.

The rocker preferably rotates/rocks around the bearing point between adjusting device and coupling mechanism and/or in a plane which is spanned by the longitudinal extent of the second fitting part and the orientation of the at least one hinge pin.

An advantageous variant of the invention is that the at least one bearing mechanism is mounted displaceable on the second fitting part in the longitudinal direction of the second fitting part.

As a result, a transmission of the height adjustment can be adapted. On the one hand, an exertion of force in the relative positioning between pivoting element and first fitting part and on the other hand a degree of fineness in the relative positioning can be adjusted.

Particularly preferably, the transmission device has a profiling, preferably formed as a step, with which the transmission device can be hooked or is hooked onto the second fitting part.

Through the profiling, an installation of the fitting is made easier and/or an undesired removal of the fitting is prevented.

In an embodiment of the invention, the transmission device comprises an elongated hole for receiving and/or guiding at least one optionally present coupling mechanism and/or for compensation for play, preferably oriented in the longitudinal direction of the second fitting part. Through the elongated hole, a play on the transmission device of between 0.2 mm and 1 mm, particularly preferably between 0.4 mm and 0.8 mm, can be compensated for and/or the elongated hole is arranged on the at least one hinge pin indirectly, particularly preferably via at least one optionally present coupling device.

Through the elongated hole, tolerances on component parts of the fitting and/or plays in movement sequences of the fitting—in particular the height adjustment of the pivoting element—can be compensated for.

The coupling device is particularly preferably formed as a, preferably curved, plate arranged around at least one hinge pin, wherein a pin or fastening element, preferably arranged orthogonal to the at least one hinge pin, of the coupling device engages in an opening of the transmission device, preferably the elongated hole. The height setting on the second fitting part can thereby be transmitted particularly beneficially to the articulated arm and/or the first fitting part.

According to a preferred embodiment of the invention, the at least one adjusting device comprises a tool receiver, a gear mechanism and/or at least one worm gear.

Through at least one worm gear, a rotational movement of the at least one adjusting device can be particularly beneficially transferred into a pivoting movement of the transmission device, wherein a translational movement of the second fitting part relative to the first fitting part can be facilitated through the pivoting movement of the transmission device. Via a gear mechanism, a movement coupling between adjusting device and transmission device can be adapted depending on the requirement placed on the fitting.

It has proved to be beneficial that the at least one worm gear is arranged on the transmission device, preferably directly and/or via at least one embossing of the transmission device, wherein it is preferably provided that the transmission device can be transferred into a rotational movement relative to the second fitting part by the at least one adjusting device and/or the second fitting part can be transferred into a translational movement relative to the first fitting part via the transmission device.

Through the embossing, a particularly secure connection between the at least one worm gear and the transmission device can be obtained. In particular, an actuation of the at least one adjusting device via a screwdriver or the like is translated into a parallel displacement of the second fitting part relative to the first fitting part.

Furthermore, preferably the first fitting part has an installation part with at least one fastening device through which the installation part can be fastened to the panel of the support, and/or the first fitting part has at least one coupling part which is connected to the second fitting part in an articulated manner and can be detachably connected to the installation part.

Through the at least one fastening device, a fixed positioning of the installation part on or in the panel can be guaranteed. Through a coupling part, a positionally stable positioning of the first fitting part with the installation part can be obtained.

The second fitting part particularly preferably has a further fastening device with which the second fitting part can be fastened to or in the pivoting element.

The fastening devices are preferably formed like a truncated cone. A profiling is preferably provided on the installation part and/or the second fitting part at the end facing away from the installation part and/or the second fitting part, in order to promote a tight fit in the panel and/or the pivoting element during an actuation of the fastening device.

In a further embodiment, the installation part of the first fitting part has a, preferably slot-shaped, housing. In the connected state to the installation part, the coupling part is received at least in regions, preferably predominantly, inside the housing of the installation part, and/or comprises at least one locking device with which the coupling part can be releasably locked to the installation part.

Through the installation part, an insertion and/or fixing of the first fitting part in the panel is made easier, in particular during the installation of the fitting and/or of the pivoting element on the panel. Work steps such as fastening the first fitting part to the panel through the coupling part are not necessary.

According to an advantageous design of the invention, the at least one locking device comprises an ejection device through which the coupling part can be ejected from the housing of the installation part at least in sections, preferably linearly, in the course of an unlocking.

In other words, the coupling part can be pushed into the installation part in a joining direction. Starting from a state in which it is coupled to the installation part, the coupling part can be actively ejected from the installation part by the ejection device, i.e. at least in sections in a direction opposite to the joining direction.

This makes it easier to remove the pivoting element from the stationary support, in particular when two or more fittings for movably mounting the pivoting element are provided. The risk of a jamming between the installation part and the coupling part is reduced in the process, wherein separating the coupling part from the installation part is made easier.

According to a preferred embodiment, the first fitting part has two further adjusting devices separate from each other and/or spaced apart from each other, with which the first fitting part is movable relative to the installation part in the longitudinal direction of the first fitting part and/or orthogonal to the longitudinal direction of the first fitting part.

The first fitting part can preferably be positioned relative to the panel in two, preferably orthogonal, bidirectional spatial directions or degrees of freedom, preferably transverse to an end face of the first fitting part and/or parallel to the end face of the first fitting part, via the two further adjusting devices. In other words, a coupling of the two further adjusting devices is provided, namely such that an actuation of one of the further adjusting devices in a first movement direction also results in an adjustment of the first fitting part in a second movement direction (and vice versa). An interlocking of the two further adjusting devices is thus provided, which results in a substantial reduction in the play of the first fitting part—in particular relative to the installation part.

It is particularly preferable that the transmission device is designed as a, preferably plate-shaped, rocker. The transmission device is arranged rotatable on the second fitting part via a bearing mechanism, and a rotational movement of the transmission device around the bearing mechanism facilitated via the bearing mechanism is translated into a translational movement of the second fitting part relative to the at least one hinge pin, preferably via a coupling of the transmission device to at least one coupling mechanism.

BRIEF DESCRIPTION OF THE DRAWINGS

The features of the device claims are applicable in the case of the features of the method claims, and vice versa. Further details and advantages of the present invention will be explained in more detail below with reference to the drawings, in which:

DETAILED DESCRIPTION OF THE INVENTION

Figure 1A:
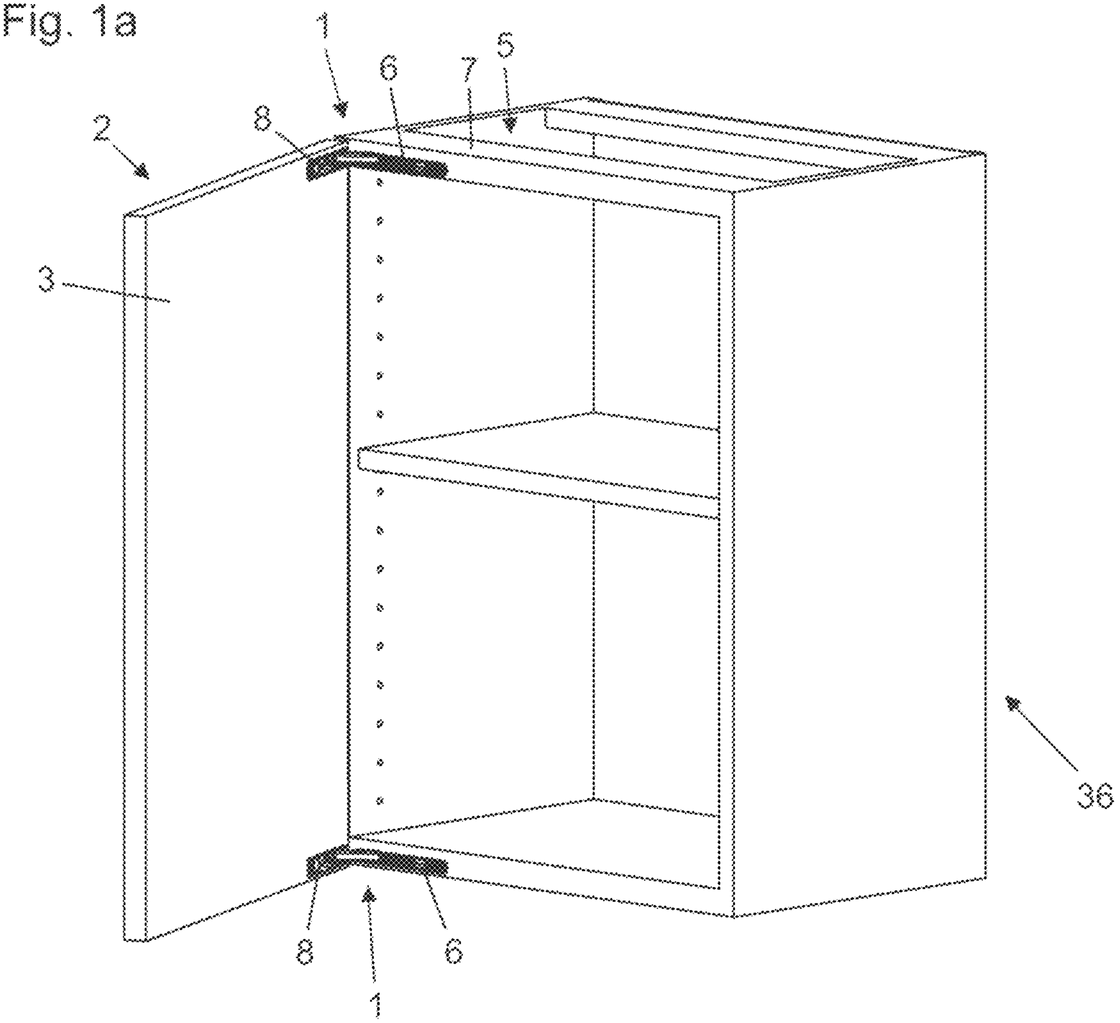
FIGS. 1*a*-1*b* show a piece of furniture with a pivoting part and two fittings according to a particularly preferred embodiment in a perspective view and a fitting in a state decoupled from an installation part of a first fitting part in a perspective view.

FIG. 1*a* shows a piece of furniture 36 with a furniture carcass as well as a stationary support 5 and two fittings 1 as furniture fittings for movably mounting a pivoting element 2 in the form of a door 3 movably mounted on the furniture carcass relative to the stationary support 5. However, the door 3 can generally also be formed, for example, as a front door—for example made of wood or enclosed in a door frame. A first fitting part 6 is inserted in the stationary support 5 at least in regions and the second fitting part 8 is inserted in the pivoting element 2 at least in regions.

Figure 1B:
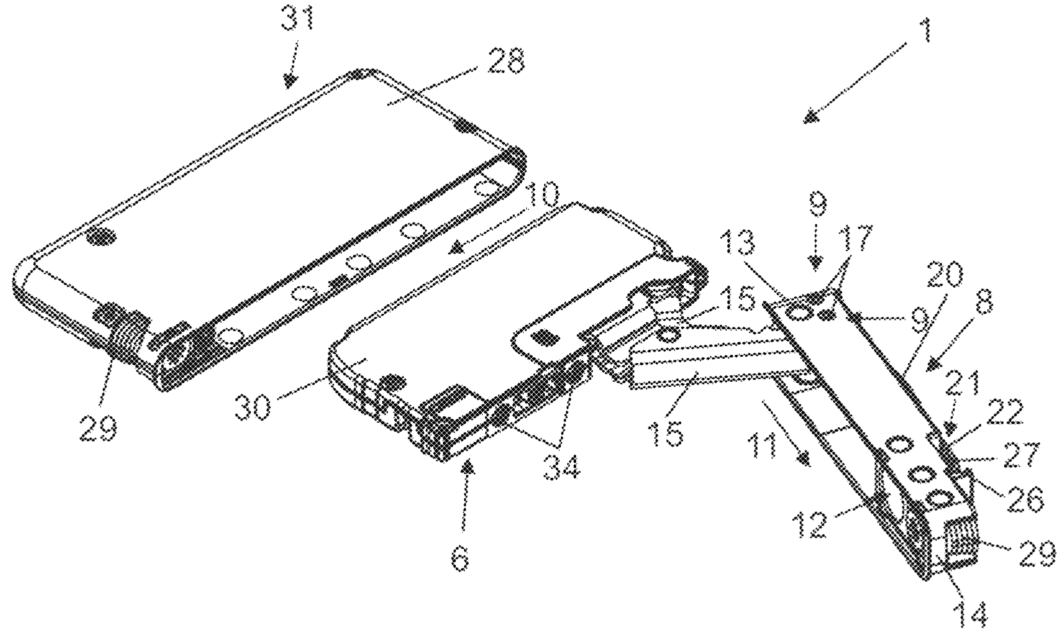

FIG. 1*b* shows the fitting 1 for movably mounting a pivoting element 2 of a door 3 or a window 4 (cf. FIGS. 8*a* and 8*b*) relative to a stationary support 5, comprising the first fitting part 6, which is formed to be fastened to a horizontally aligned panel 7 of the support 5, and the second fitting part 8 for fastening to the pivoting element 2, wherein the second fitting part 8 is pivotably connected to the first fitting part 6.

The first fitting part 6 is arranged on the second fitting part 8 via an articulated lever with two two articulated portions 15. The fitting 1 comprises three hinge pins 9, which are arranged on the second fitting part 8 and oriented orthogonally relative to a longitudinal extent 10, 11 of the first fitting part 6 and the second fitting part 8. The first hinge pin 9 is arranged on the first articulated lever portion 15 and the second fitting part 8, the second hinge pin 9 is arranged on the second articulated lever portion 15 and the second fitting part and the third hinge pin is arranged on the second articulated lever portion 15 (obscured by a mounting of the second fitting part in the representation). All three hinge pins 9 are arranged on a coupling mechanism 16 for the movement-coupling of the articulated lever portions 15 to an adjusting device 12. In general, however, only one hinge pin can also be connected to the coupling mechanism 16 for the connection of an articulated lever portion 15 to the second fitting part 8.

Figure 2A:
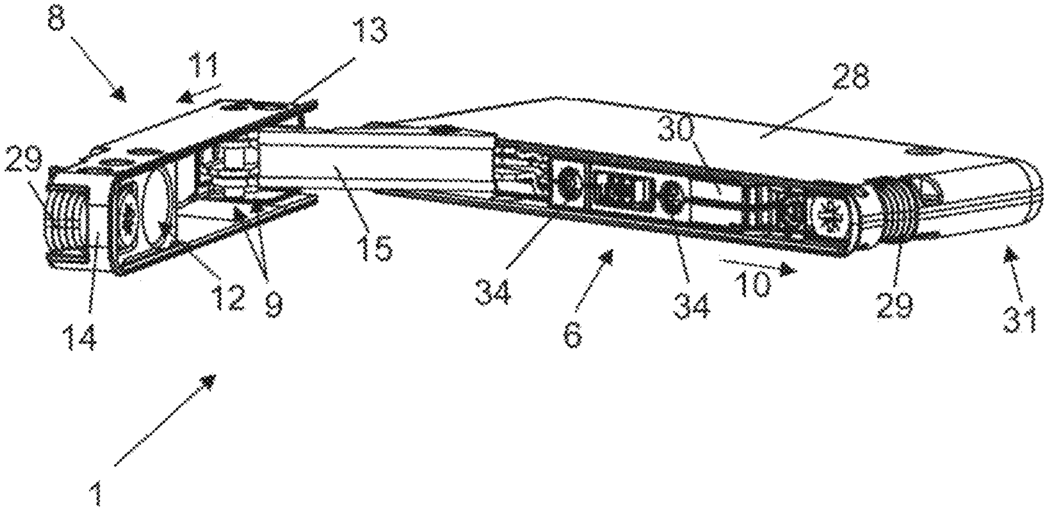
FIGS. 2*a*-2*b* show the fitting according to the embodiment according to FIG. 1*b* in a coupled state in a perspective view and in the decoupled state in a view from the side with a hidden installation component part.

FIG. 2*a* shows that the hinge pins 9 are formed as pins 17. Two pins 17 are provided as pivot points for a pivoting movement of the second fitting part 8 with respect to the articulated lever portions 15, and the second fitting part 8 is guided by two pins 17 during a height adjustment of the second fitting part 8 relative to the first fitting part 6. The articulated levers lever portions 15 are arranged on the second fitting part 8 via two pins 17 and a shorter pin 17 (through the articulated lever) is provided for securing one of the two articulated lever portions 15.

The fitting 1 comprises an adjusting device 12 (for structural details of the embodiment see FIGS. 3*a* and 3*b*) for adjusting an alignment of the second fitting part 8 relative to the first fitting part 6 along the hinge pins 9, wherein the second fitting part 8 is displaceable relative to the first fitting part 6 in a direction parallel to the hinge pins 9 via the adjusting device 12.

The adjusting device 12 is spaced apart from the hinge pins 9 in the direction of the longitudinal extent 11 of the second fitting part. The second fitting part 8 is formed cuboidal. The hinge pins 9 are arranged in the region of a first end 13 of the second fitting part 8 and the adjusting device 12 is arranged in the region of a second end 14 of the second fitting part 8 spaced apart in the longitudinal direction 11 of the second fitting part 8.

Figure 2B:
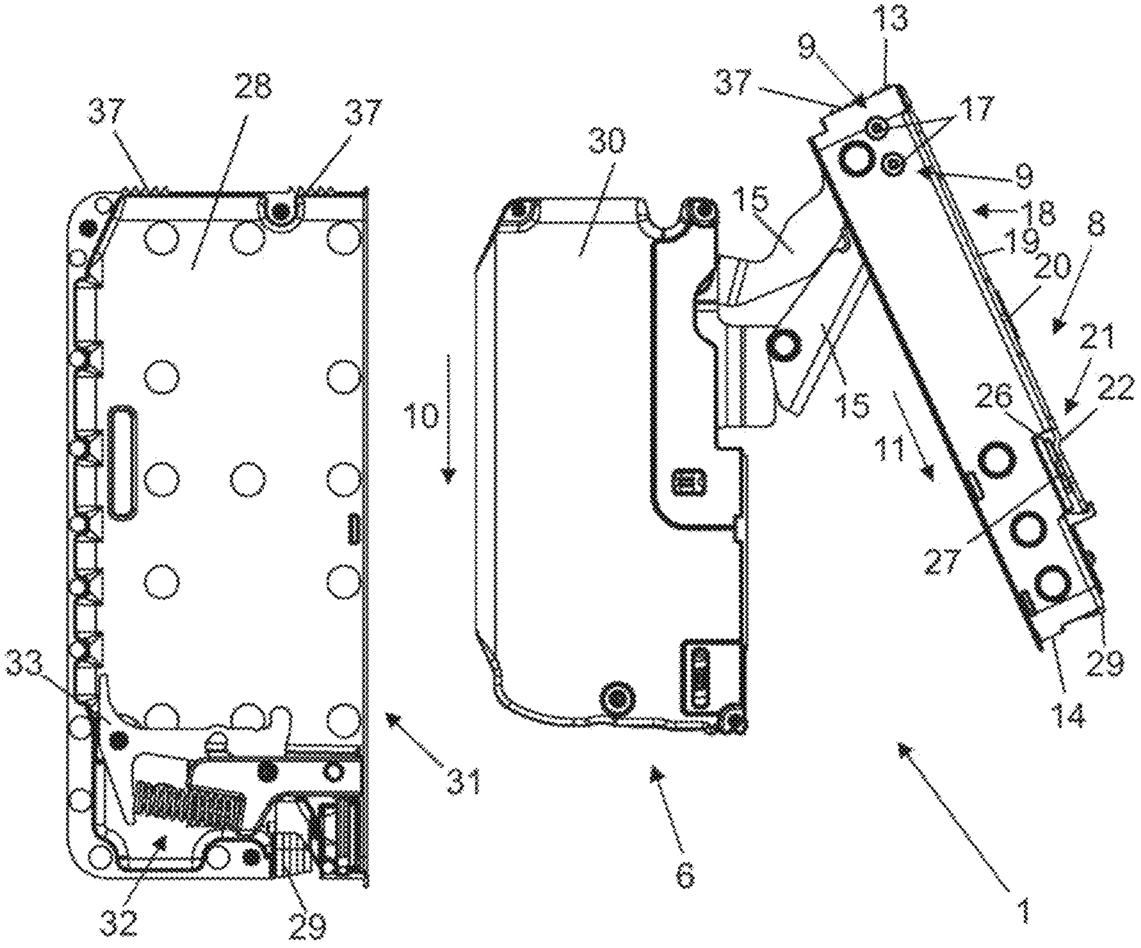

FIG. 2*b* shows that the first fitting part 6 has an installation part 28 with a fastening device 29 through which the installation part 28 can be fastened to the panel 7 of the support 5. The second fitting part 8 has a further fastening device 29 with which the second fitting part 8 can be fastened to the pivoting element 2. Profilings 37 are arranged on the fitting parts 6, 8 at the ends facing away from the fastening devices 29, in order to brace the fitting 1 against the material of the pivoting element 2 or the panel 7. The first fitting part 6 comprises the installation part 28 and a coupling part 30 which is connected to the second fitting part 8 in an articulated manner and can be detachably connected to the installation part 28.

The installation part 28 of the first fitting part 6 has a slot-shaped housing 31, wherein, in the connected state to the installation part 28, the coupling part 30 is predominantly received inside the housing 31 of the installation part 28. The installation part 28 has a locking device 32 with which the coupling part 30 can be releasably locked to the installation part 28, wherein the locking device 32 comprises an ejection device 33 through which the coupling part 30 can be linearly ejected from the housing 31 of the installation part 28 in sections in the course of an unlocking.

Figure 3A:
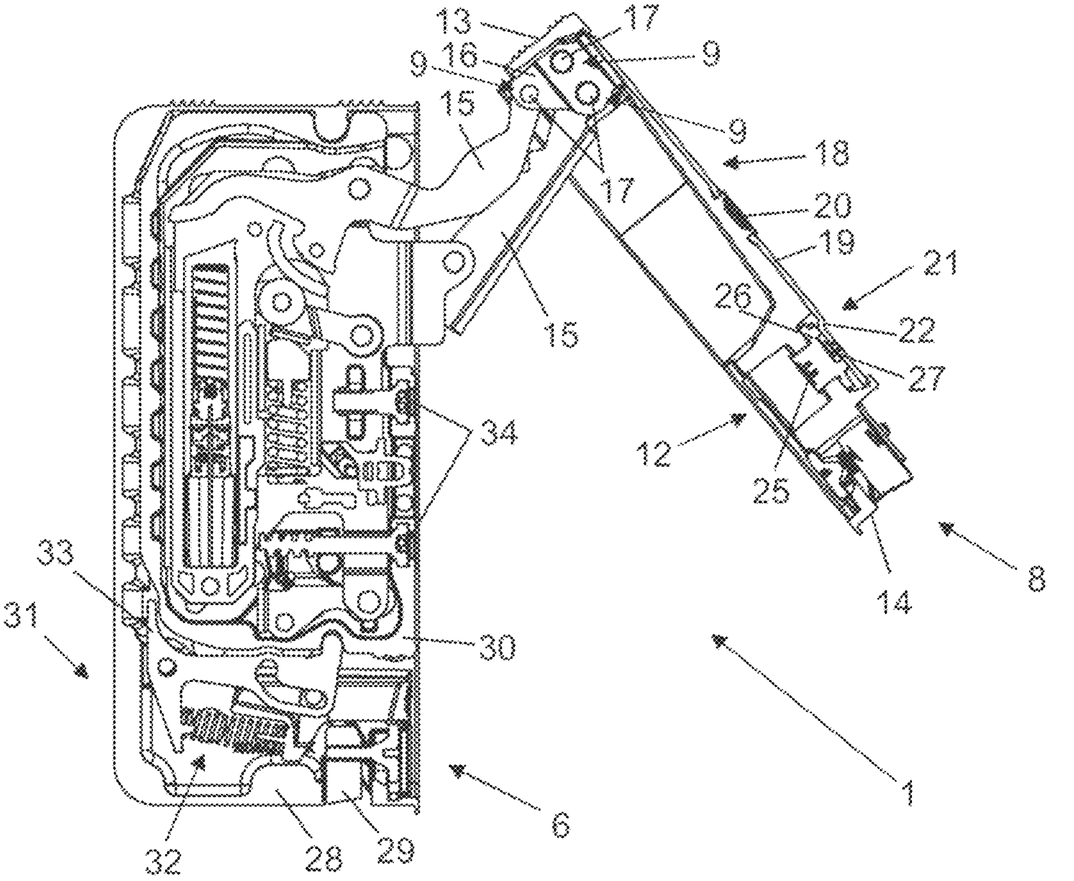
FIGS. 3*a*-3*b* show the fitting according to the embodiment according to FIG. 1*b* in a sectional view and in a perspective view with an exploded representation of a second fitting part, FIG. 4 show the fitting according to the embodiment according to FIG. 1*b* in a rear view, a front view and a perspective view.

FIG. 3*a* shows a sectional representation through the fitting 1, showing the two articulated lever portions 15 arranged on the hinge pins 9 and the coupling mechanism 16 in the form of a connecting plate.

The adjusting device 12 comprises a tool receiver 24 for a screwdriver, a gear mechanism 25 and a worm gear 26, wherein the worm gear 26 interacts with a link between the adjusting device 12 and the hinge pins 9, the link being in the form of a transmission device 18. In general, a gear mechanism 25 can be dispensed with.

Figure 3B:
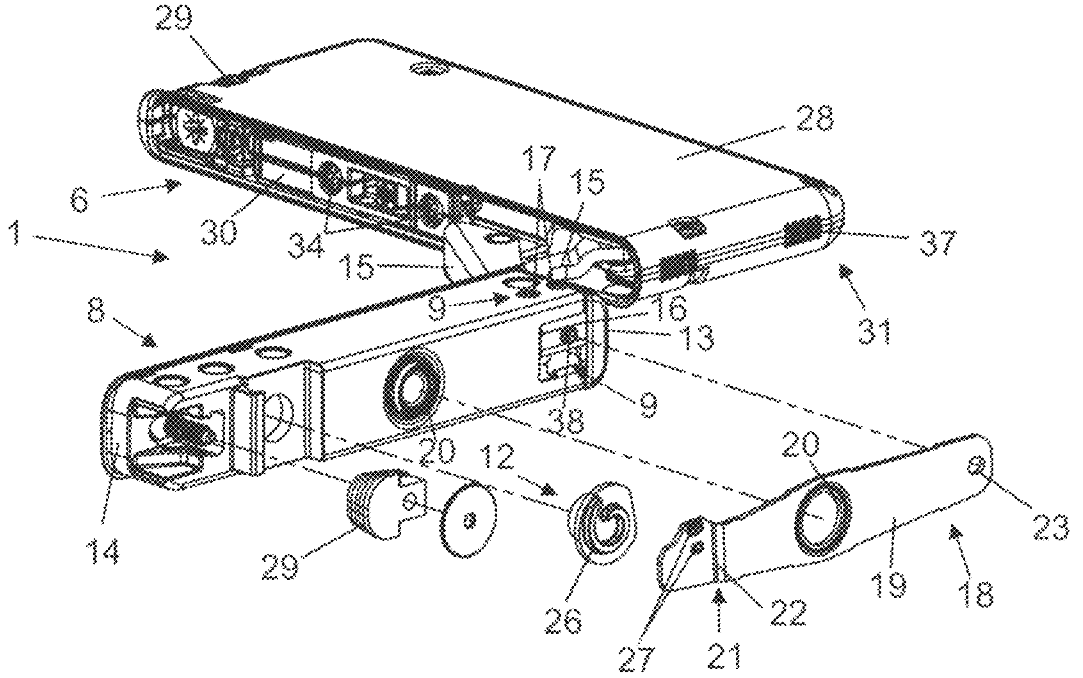

FIG. 3*b* shows an exploded representation of the second fitting part, wherein a transmission device 18 is arranged between the adjusting device 12 and the hinge pins 9 in the longitudinal direction 11 of the second fitting part 8. The transmission device 18 extends across the adjusting device 12 and the hinge pins 9, but this is in general not necessary.

The transmission device 18 is designed as a plate-shaped rocker 19, wherein the transmission device 18 is arranged rotatable on the second fitting part 8 via a bearing mechanism 20 arranged between the hinge pins 9 and the at least one adjusting device 12 and spaced apart from the hinge pins 9 and the adjusting device 12. A rotational movement of the transmission device 18 around the bearing mechanism 20 facilitated via the bearing mechanism 20 can be translated into a translational movement of the second fitting part 8 relative to two of the three hinge pins 9 (connected to the second fitting part 8) via a coupling of the transmission device 18 to the coupling mechanism 16.

The transmission device 18 has a profiling 21 as a step 22, with which the transmission device 18 can be hooked onto the second fitting part 8.

The transmission device 18 comprises an elongated hole 23 oriented in the longitudinal direction 11 of the second fitting part 8 for receiving and guiding the coupling mechanism 16 as well as for compensation for play. The elongated hole 23 can generally also be oriented orthogonally to the longitudinal direction 11. Through the elongated hole 23, a play on the transmission device 18 of between 0.4 mm and 0.8 mm can be compensated for, wherein the elongated hole 23 is arranged on the hinge pins 9 indirectly via a fastening device 38 of the coupling mechanism 16.

The worm gear 26 is engaged with the transmission device 18 via two embossings 27 of the transmission device 18, wherein the worm gear 26 is partially arranged between the two embossings 27 and, via an inclination of the worm gear 26 or rather a rotational movement of the worm gear 26, generates a pivoting movement of the transmission device 18, which causes a translational movement of the coupling mechanism 16 and of the articulated levers (articulated lever portions) 15 relative to the hinge pins 9. The transmission device 18 is transferred into a rotational movement relative to a body of the second fitting part 8 by the adjusting device 12, and the second fitting part 8 is transferred into a translational movement relative to the first fitting part 6 via the transmission device 18.

Figure 4:
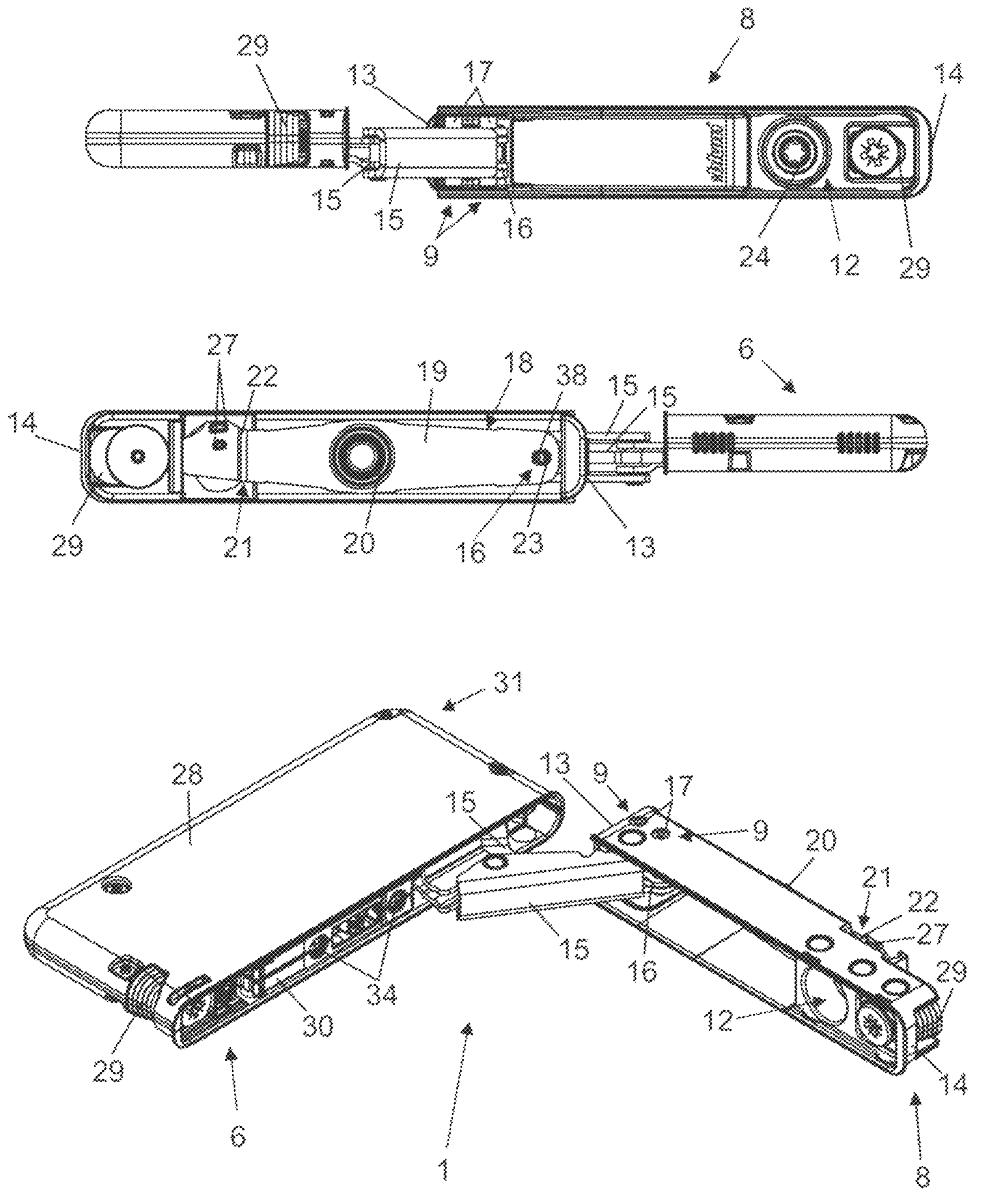

FIG. 4 shows the fitting 1 in a position which makes a height adjustment possible both upward and downward in the vertical direction in the use position of the fitting 1. Two different movement positions-initiated by the adjusting device 12-starting from this positioning of the first fitting part 6 with respect to the second fitting part 8 are visible in FIGS. 5*a* to 6*b* as changed height adjustments of the fitting 1. The bearing mechanism 20 is arranged fixed on the second fitting part 8 and makes a rotation of the transmission device 18 possible. The bearing mechanism 20 can generally also be mounted displaceable on the second fitting part 8 in the longitudinal direction 11 of the second fitting part 8, in order to be able to change a force and/or fineness transmission in relation to the adjusting device 12.

Figure 5A:
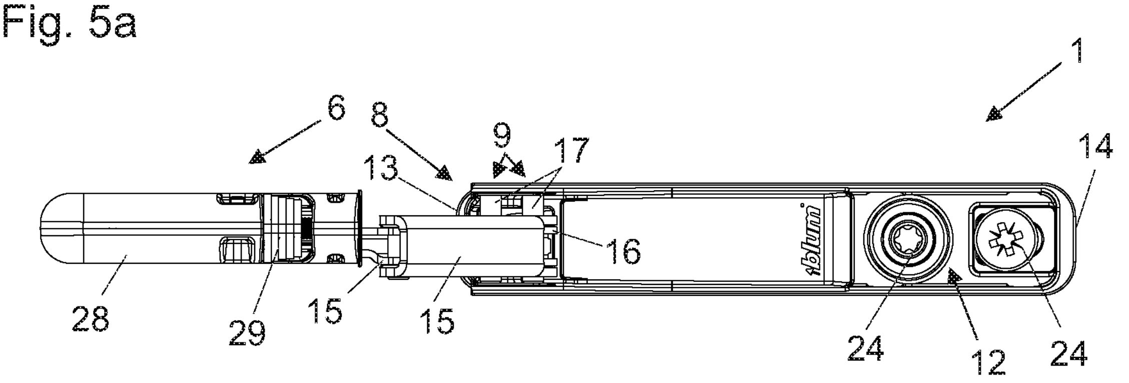
FIGS. 5*a*-6*b* show the fitting according to the embodiment according to FIG. 1*b* in a rear view and a front view, in each case with a changed height adjustment of the first fitting part relative to the second fitting part.

FIG. 5*a* shows the fitting 1, wherein the second fitting part 8 has been maximally displaced along the hinge pins 9 relative to the first fitting part 6 and the articulated levers (articulated lever portions) 15. In the use position of the fitting 1 on the pivoting element 2, the pivoting element 2 has been maximally height-adjusted upward in the vertical direction. The operating access to the adjusting device 12 is visible.

Figure 5B:
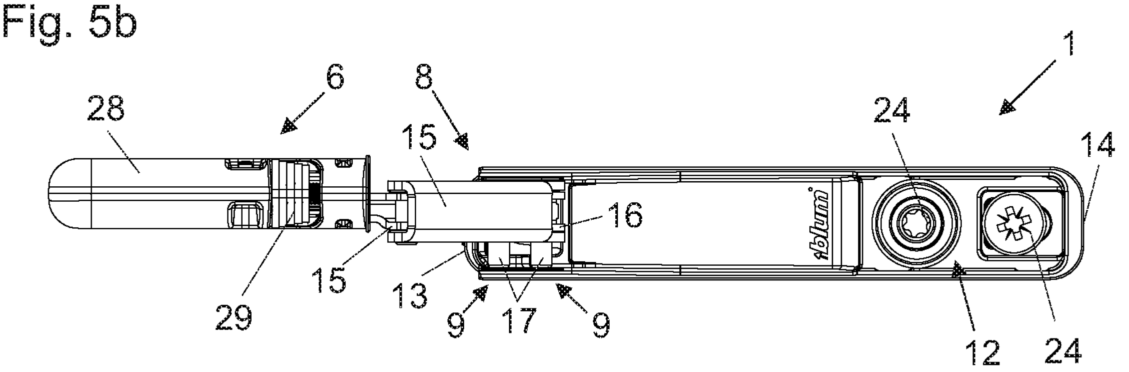

FIG. 5*b* differs from FIG. 5*a* merely to the effect that the second fitting part 8 has been maximally displaced in the opposite direction along the hinge pins 9 by the adjusting device 12, with the result that the pivoting element 2 is maximally height-adjusted downward in the vertical direction.

Figure 6A:
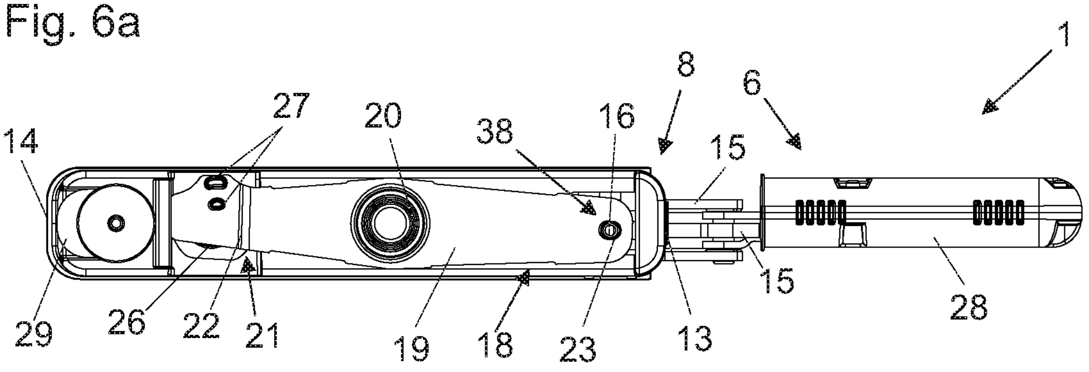

FIG. 6*a* shows the fitting 1 according to the state of height adjustment of the fitting 1 according to FIG. 5*a*, wherein the fitting is represented rotated through 180 degrees in the vertical direction (around the direction of the height adjustment of the second fitting part 8). Mechanical component parts of the transmission of the height adjustment from the adjusting device to the first fitting part 6 are visible.

Figure 6B:
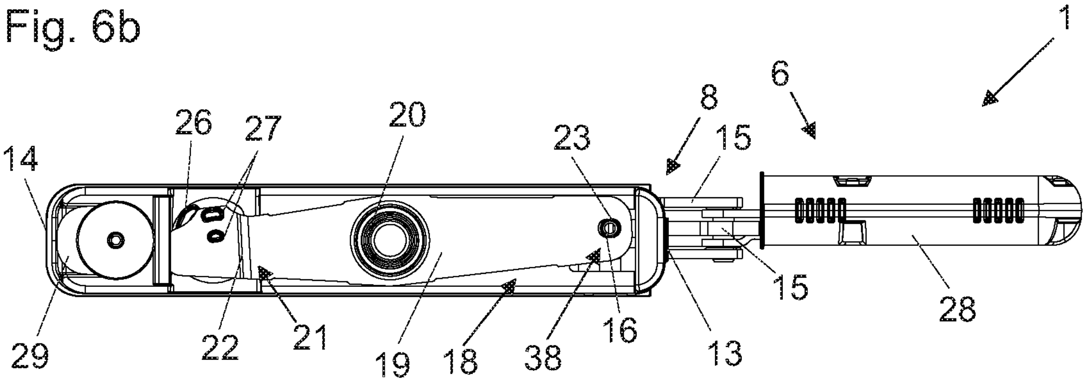

FIG. 6*b* differs from FIG. 6*a* merely to the effect that the fitting 1 is in the positioning of the first fitting part 6 with respect to the second fitting part 8 shown in FIG. 5*b*. In comparison with FIG. 6*a*, the transmission device 18 has been pivoted around the bearing mechanism 20 by the adjusting device 12, wherein the transmission device 18 transfers this rotation into a linear movement of the first fitting part 6 with respect to the second fitting part 8 via the coupling mechanism 16 engaging in the elongated hole 23.

Figure 7A:
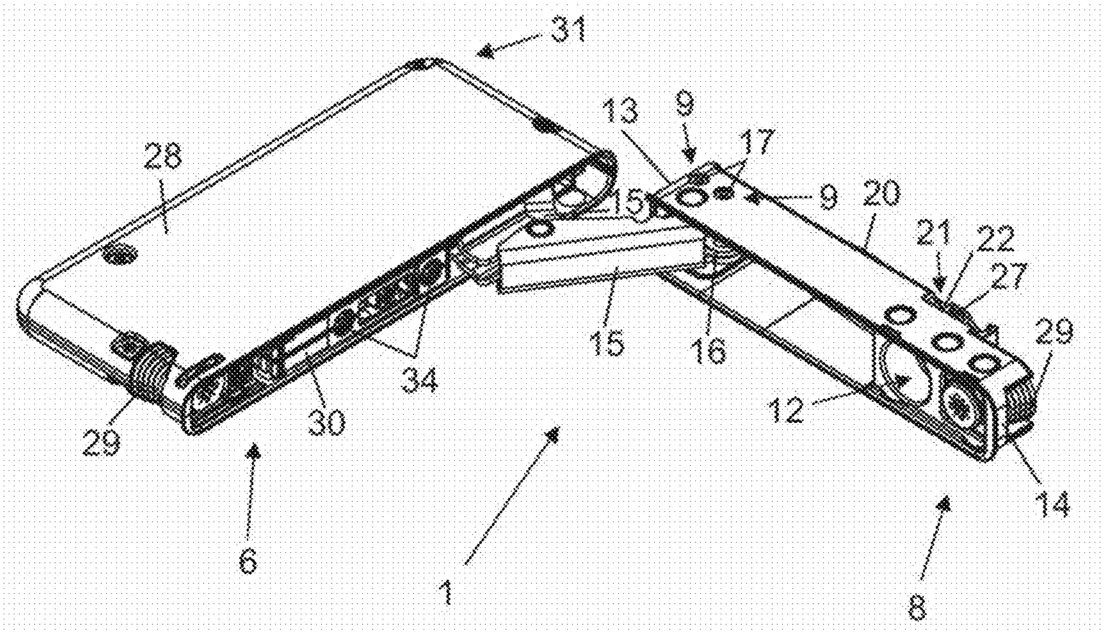
FIGS. 7*a*-7*b* show the fitting according to the embodiment according to FIG. 1*b* in a perspective view with a changed relative positioning of the second fitting part with respect to the first fitting part.
Figure 7B:
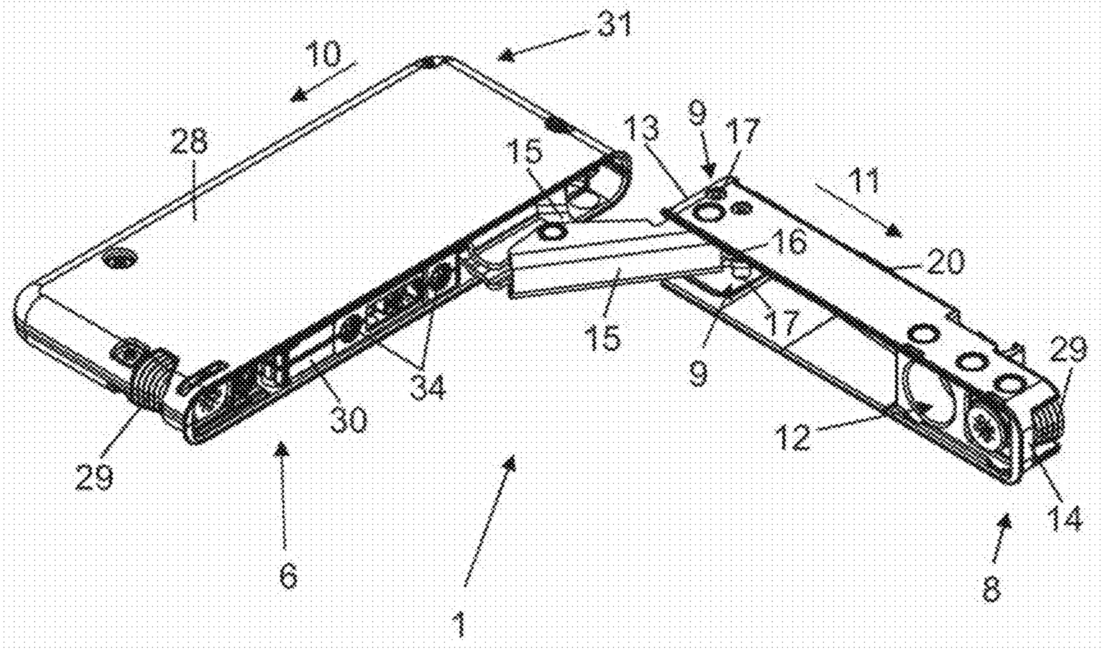

FIGS. 7*a* and 7*b* show the two extreme positions of the height adjustment of the fitting 1 or the relative positioning of the first fitting part 6 with respect to the second fitting part 8 via the adjusting device 12-facilitated via the transmission device 18 and the coupling mechanism 16—in a perspective representation. The first fitting part 6 comprises two further adjusting devices 34 separate from each other and/or spaced apart from each other, with which the coupling part 30 of the first fitting part 6 is movable relative to the installation part 28 or the panel 7 or the support 5 in the longitudinal direction 10 of the first fitting part 6 and orthogonal to the longitudinal direction 10 of the first fitting part 6.

A method for adjusting the height of the fitting 1 or of a pivoting element 2 relative to a stationary support 5 through the fitting 1 can be explained as follows: the transmission device 18 is transferred into a rotational movement relative to the second fitting part 8 by the adjusting device 12 and the second fitting part 8 is transferred into a translational movement relative to the first fitting part 6 via the transmission device 18.

The transmission device 18 is designed as a plate-shaped rocker 19. The transmission device 18 is arranged rotatable on the second fitting part 8 via the bearing mechanism 20, whereby a rotational movement of the transmission device 18 around the bearing mechanism 20 facilitated via the bearing mechanism 20 can be translated into a translational movement of the second fitting part 8 relative to one of the hinge pins 9 via a coupling of the transmission device 18 to the coupling mechanism 16..

Figure 8A:
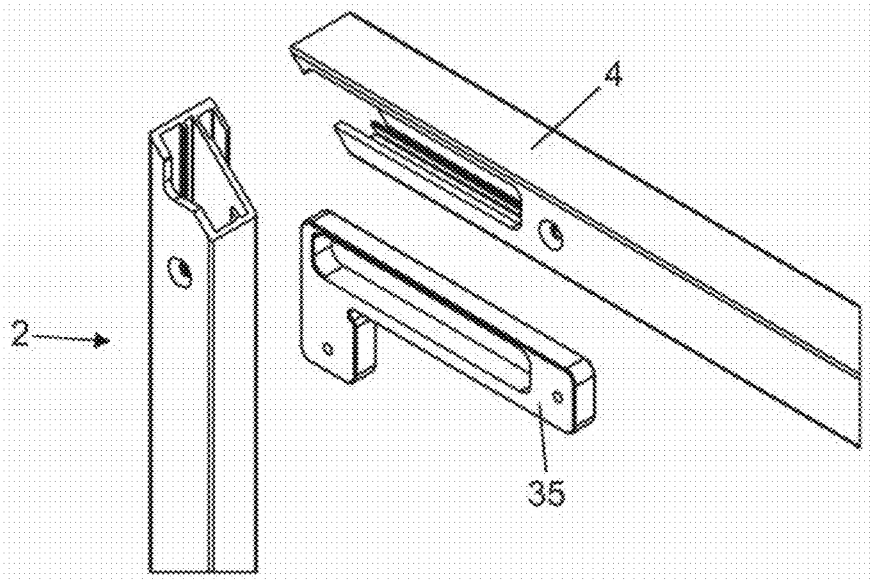
FIGS. 8*a*-8*b* show a window as pivoting element with an integrated mounting in an exploded representation and in an installed state with inserted fitting according to FIG. 1*b* in a perspective view.

FIG. 8*a* shows a pivoting element 2 in the form of a window 4 with a mounting 35 integrated in the pivoting element 2. A material of the pivoting element 2 and the mounting 35 is generally as desired, but in this embodiment is present as a metallic material.

Figure 8B:
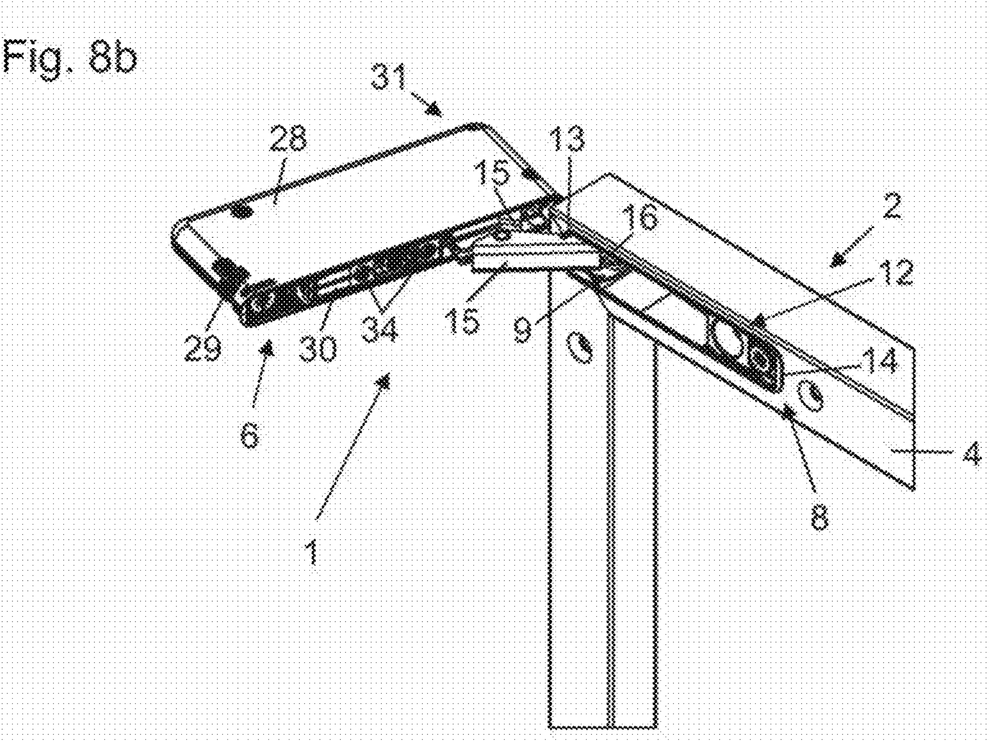

FIG. 8*b* shows an arrangement of the window 4 in the installed state with a fitting 1 inserted into the mounting 35, wherein the second fitting part 8 of the fitting 1 is integrated in the mounting 35.

The invention claimed is:

1. A fitting for movably mounting a pivoting element relative to a stationary support, the fitting comprising:

a first fitting part to be fastened to a panel of the support, a second fitting part to be fastened to the pivoting element, the second fitting part being pivotably connected to the first fitting part, a hinge pin arranged on the second fitting part and oriented substantially orthogonally relative to a longitudinal axis of the first fitting part and/or the second fitting part, and an adjusting device configured to adjust an alignment of the second fitting part relative to the first fitting part along the hinge pin by displacing the second fitting part relative to the first fitting part in a direction parallel to the hinge pin via a link, wherein the adjusting device is spaced apart from hinge pin in a direction along the longitudinal axis of the second fitting part, the second fitting part being cuboidal and having the adjusting device therein.

2. The fitting according to claim 1, wherein the hinge pin is arranged at a first end of the second fitting part, and the adjusting device is arranged at a second end of the second fitting part spaced apart from the hinge pin along the longitudinal axis of the second fitting part.

3. The fitting according to claim 1, wherein the first fitting part is connected to the second fitting part via an articulated lever.

4. The fitting according to claim 3, wherein the articulated lever comprises at least two lever portions, and the hinge pin is a first one of precisely two pins connecting a first one of the at least two lever portions to the second fitting part.

5. The fitting according to claim 4, wherein a first one of the at least two lever portions of the articulated lever is attached to the precisely two hinge pins via a coupling mechanism, and wherein:

at least one of the second fitting part and the coupling mechanism are configured to be guided by the precisely two pins during a height adjustment movement of the second fitting part relative to the first fitting part, or the articulated lever is arranged on the second fitting part via at least one of the two pins, or the fitting further comprises an articulated lever pin securing the articulated lever to the second fitting part.

6. The fitting according to claim 3, wherein the articulated lever comprises at least two lever portions, and a first one of the at least two lever portions is attached to the hinge pin via a coupling mechanism.

7. The fitting according to claim 6, wherein the coupling mechanism is a connecting plate.

8. The fitting according to claim 1, wherein the link is a transmission device arranged between the adjusting device and the hinge pin along the longitudinal axis of the second fitting part.

9. The fitting according to claim 8, wherein the transmission device is a plate-shaped rocker rotatable on the second fitting part via a bearing mechanism.

10. The fitting according to claim 9, wherein the bearing mechanism is mounted displaceable on the second fitting part along the longitudinal axis of the second fitting part.

11. The fitting according to claim 9, wherein the bearing mechanism is arranged between the hinge pin and the adjusting device and/or is spaced apart from at least one of the hinge pin and the adjusting device.

12. The fitting according to claim 11, wherein the transmission device, the adjusting device, the hinge pin, and the bearing mechanism are configured such that a rotational movement of the transmission device around the bearing mechanism facilitated via the bearing mechanism is converted to a translational movement of the second fitting part relative to the hinge pin via a connection of the transmission device to a coupling mechanism of the second fitting part.

13. The fitting according to claim 8, wherein the transmission device has a step configured to allow the transmission device to be hooked onto the second fitting part.

14. The fitting according to claim 8, wherein the transmission device has an elongated hole for receiving and/or guiding a coupling mechanism and for compensating for play between the adjusting device, the transmission device, and the hinge pin.

15. The fitting according to claim 14, wherein the elongated hole extends along the longitudinal axis of the second fitting part, and the elongated hole is:
configured to compensate for play of the transmission device of between 0.4 mm and 0.8 mm, and/or
arranged indirectly on the hinge pin via a coupling device.

16. The fitting according to claim 1, wherein the adjusting device comprises a tool receiver, a gear mechanism, and/or a worm gear.

17. The fitting according to claim 16, wherein the worm gear is arranged on the transmission device directly and/or via an embossing of the transmission device.

18. The fitting according to claim 17, wherein:
the transmission device is configured to be moved rotationally relative to the second fitting part by the adjusting device, and/or
the second fitting part is configured to be moved translationally relative to the first fitting part via the transmission device.

19. The fitting according to claim 1, wherein:
the first fitting part includes an installation part with a fastening device through which the installation part is to be fastened to the panel of the support, and
the first fitting part has a coupling part connected to the second fitting part in an articulated manner and detachably connected to the installation part.

20. The fitting according to claim 19, wherein:
the installation part of the first fitting part has a slot-shaped housing, and the coupling part is at least partially received inside the housing of the installation part when the coupling part is connected to the installation part, and/or
the first fitting part further includes a locking device to releasably lock the coupling part to the installation part.

21. The fitting according to claim 20, wherein the locking device comprises an ejection device configured to linearly eject the coupling part from the housing of the installation part during an unlocking process.

22. The fitting according to claim 19, wherein the adjusting device is a first adjusting device, the first fitting part including a pair of second adjusting devices separate from each other and/or spaced apart from each other, the pair of second adjusting devices being configured to move the first fitting part relative to the installation part along a longitudinal axis of the first fitting part and/or orthogonal to the longitudinal axis of the first fitting part.

23. An assembly comprising:
the fitting according to claim 1; and
a mounting for receiving at least part of the second fitting part inside the mounting.

24. A piece of furniture comprising:
a stationary support, and
the fitting according to claim 1 for movably mounting the pivoting element relative to the stationary support,
wherein the first fitting part is at least partially inserted in the stationary support, and the second fitting part is at least partially inserted in the pivoting element.

25. A method of adjusting a height of the fitting according to claim 1, the method comprising:
transferring a transmission device into a rotational movement relative to the second fitting part by the adjusting device, and
transferring the second fitting part into a translational movement relative to the first fitting part via the transmission device.

26. The method according to claim 25, wherein the transmission device is a plate-shaped rocker, and the transmission device is rotatably arranged on the second fitting part via a bearing mechanism, wherein a rotational movement of the transmission device around the bearing mechanism via the bearing mechanism is converted into a translational movement of the second fitting part relative to the hinge pin via a coupling of the transmission device to a coupling mechanism.

27. A fitting for movably mounting a pivoting element relative to a stationary support, the fitting comprising:
a first fitting part to be fastened to a panel of the support,
a second fitting part to be fastened to the pivoting element, the second fitting part being pivotably connected to the first fitting part,
a hinge pin arranged on the second fitting part and oriented substantially orthogonally relative to a longitudinal axis of the first fitting part and/or the second fitting part,
an adjusting device configured to adjust an alignment of the second fitting part relative to the first fitting part along the hinge pin by displacing the second fitting part relative to the first fitting part in a direction parallel to the hinge pin, and
a transmission device between and connecting the adjusting device and the hinge pin and extending along the longitudinal axis of the second fitting part,
wherein the adjusting device is spaced apart from hinge pin in a direction along the longitudinal axis of the second fitting part.

28. A fitting for movably mounting a pivoting element relative to a stationary support, the fitting comprising:
a first fitting part to be fastened to a panel of the support,
a second fitting part to be fastened to the pivoting element, the second fitting part being pivotably connected to the first fitting part,
a hinge pin arranged on the second fitting part and oriented substantially orthogonally relative to a longitudinal axis of the first fitting part and/or the second fitting part, and
an adjusting device configured to adjust an alignment of the second fitting part relative to the first fitting part along the hinge pin by displacing the second fitting part relative to the first fitting part in a direction parallel to the hinge pin via a link, wherein the adjusting device is spaced apart from hinge pin in a direction along the longitudinal axis of the second fitting part, and wherein the second fitting part has a first end and a second end spaced apart from the first end along the longitudinal axis of the second fitting part, the hinge pin being arranged at the first end of the second fitting part, and the adjusting device being arranged between the hinge pin and the second end of the second fitting part.

* * * * *